United States Patent [19]

Gullett

[11] Patent Number: 4,685,279

[45] Date of Patent: Aug. 11, 1987

[54] WEED TRIMMER

[76] Inventor: Bradley T. Gullett, 560 Lake Kathryn Cir., Casselberry, Fla. 32707

[21] Appl. No.: 819,637

[22] Filed: Jan. 17, 1986

[51] Int. Cl.$^4$ ...................... A01D 34/67; A01D 50/00
[52] U.S. Cl. ......................................... 56/12.7; 30/276
[58] Field of Search ..................... 56/12.7; 30/276, 347

[56] References Cited

U.S. PATENT DOCUMENTS

| | | | |
|---|---|---|---|
| 4,024,635 | 5/1977 | Mizuno et al. | 56/12.7 |
| 4,068,376 | 1/1978 | Briar | 30/276 |
| 4,077,190 | 3/1978 | Critas | 56/12.7 |
| 4,137,694 | 2/1979 | Hopper | 56/12.7 |
| 4,177,561 | 12/1979 | Ballas | 56/12.7 |
| 4,185,380 | 1/1980 | Hindman, Jr. | 56/12.7 |
| 4,189,905 | 2/1980 | Frantello | 30/276 |
| 4,223,440 | 9/1980 | Inaga | 56/12.7 |
| 4,229,882 | 10/1980 | Chartier | 56/12.7 |
| 4,242,297 | 1/1981 | Palmieri et al. | 56/12.7 |
| 4,290,200 | 9/1981 | Lombard | 56/12.7 |
| 4,557,052 | 12/1985 | Baba et al. | 56/12.7 |

Primary Examiner—Paul J. Hirsch
Attorney, Agent, or Firm—Clifton Ted Hunt

[57] ABSTRACT

A trimmer head for supporting replaceable flexible cutting elements used in trimming grass and weeds is equipped with several arbors to facilitate operative attachment to existing power tools. A head is positioned on the chuck of a selected arbor and includes grooves and abutments to receive and frictionally engage the medial portions of the flexible cutters, whose feed ends extend radially beyond the head. A circular shield is threaded on the arbor and tightened against the head. The circular shield includes a clamping plate which engages and clamps the medial portions of the flexible cutters against the head in use.

12 Claims, 9 Drawing Figures

WEED TRIMMER

BACKGROUND OF THE INVENTION

This invention relates to weed trimmers of the type attached to powered hand tools for cutting vegetation such as grass and weeds.

The invention comprises a head for attachment to a portable powered tool and the head includes a cutting element for cutting the weeds and other vegetation and means for attaching the cutting element to the power tool.

The invention as thus far described is well known. U.S. Pat. No. 4,229,882 issued Oct. 28, 1980 to Elderick D. Chartier for CUTTER HEAD AND CUTTERS FOR A VEGETATION CUTTING TOOL discloses a cutter head for attachment to existing powered tools including a drive stud or arbor for threaded attachment to a driven shaft of an existing power tool. The drive shaft or arbor in Chartier penetrates the body and is threadably engaged with a closure plate to complete the assembly. The cutter elements of Chartier are preformed wire blades, the fixed end of each wire blade being looped about a boss and extending about a centrally located abutment with the free end of the blade extending radially outwardly from the cutter head. The wire blades of Chartier present a safety hazard.

U.S. Pat. No. 4,300,336 issued Nov. 17, 1981 to Hiromasa Miyata for CUTTER BLADE ASSEMBLY FOR WEED AND GRASS TRIMMERS discloses a generally flat circular cutting blade with a plurality of cutting teeth extending radially therefrom. In one embodiment an upper securing plate is disposed above the cutter blade and a second or lower securing plate is disposed beneath the cutting blade. The two securing plates are fastened together to clamp the cutting blade between them. The cutting teeth extending radially outwardly from the cutting plate are stiff or rigid and include a beveled cutting edge which presents a safety hazard.

U.S. Pat. No. 4,268,964 issued May 26 1981 to James R. Moore for APPARATUS FOR CUTTING, TRIMMING AND EDGING VEGETATION AND THE LIKE discloses a vegetation cutter using flexible monofilament line such as commonly used for fishing, as a cutting element. Moore's cutting elements or flails are connected at corresponding fixed ends to a support structure rotatable with a drive shaft of a power tool. The support structure which supports the cutting elements is protected by a larger diameter shield and the cutting elements extend outwardly beyond the protective shield.

SUMMARY OF THE INVENTION

The present invention is a trimmer head intended for use on existing power tools for cutting vegetation and comprising a circular hub having an axial opening of square or hexagonal configuration to receive a correspondingly shaped arbor for attachment to an existing power tool. A plurality of combination support and guide fingers are formed integral with and extend radially from the hub in equally spaced relation to each other. Viewed from the underside, each of the fingers has a radially extending groove communicating with the free ends of respective fingers and with a circular cavity in the underside of the hub. Cutting elements in the form of polyurethane monofilaments are positioned in the grooves of adjacent fingers with the medial portion of the cutting element in the cavity in the hub and the free ends of the cutting element extending radially outwardly from adjacent fingers. A rounded abutment within the cavity in the hub extends between the adjacent fingers supporting a flexible monofilament cutter. The medial portion of the flexible monofilament cutter is supported and stabilized by the rounded abutment.

The arbor includes a threaded stud extending through the cavity in the hub and vertically engaging a circular shield including an inner clamping plate of a diameter corresponding to the diameter of the cavity in the hub. The closure plate has an overall diameter greater than the diameter of the hub and its fingers to shield the fingers from engagement with trees and the like. The assembly is completed by threading the closure plate on the arbor until the clamping plate firmly engages the medial portions of the flexible monofilament cutter elements to clamp them against the surface of the cavity and hold them in place.

The flexible monofilament cutter elements are made from a polyurethane composition that does not split and fray at the ends after repeated striking of an object such as a fence or stone, and which is operable for a minimum of one and a half hours trimming vegetation against walls before replacement is required.

DETAILED DESCRIPTION OF THE INVENTION

Figure 1:
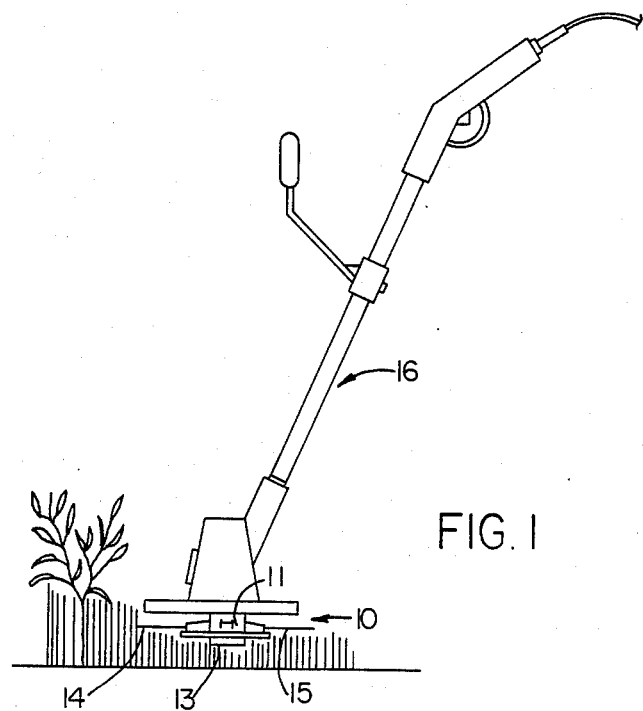
FIG. 1 is an environmental view illustrating the trimmer head operatively connected to an existing power tool.
Figure 2:
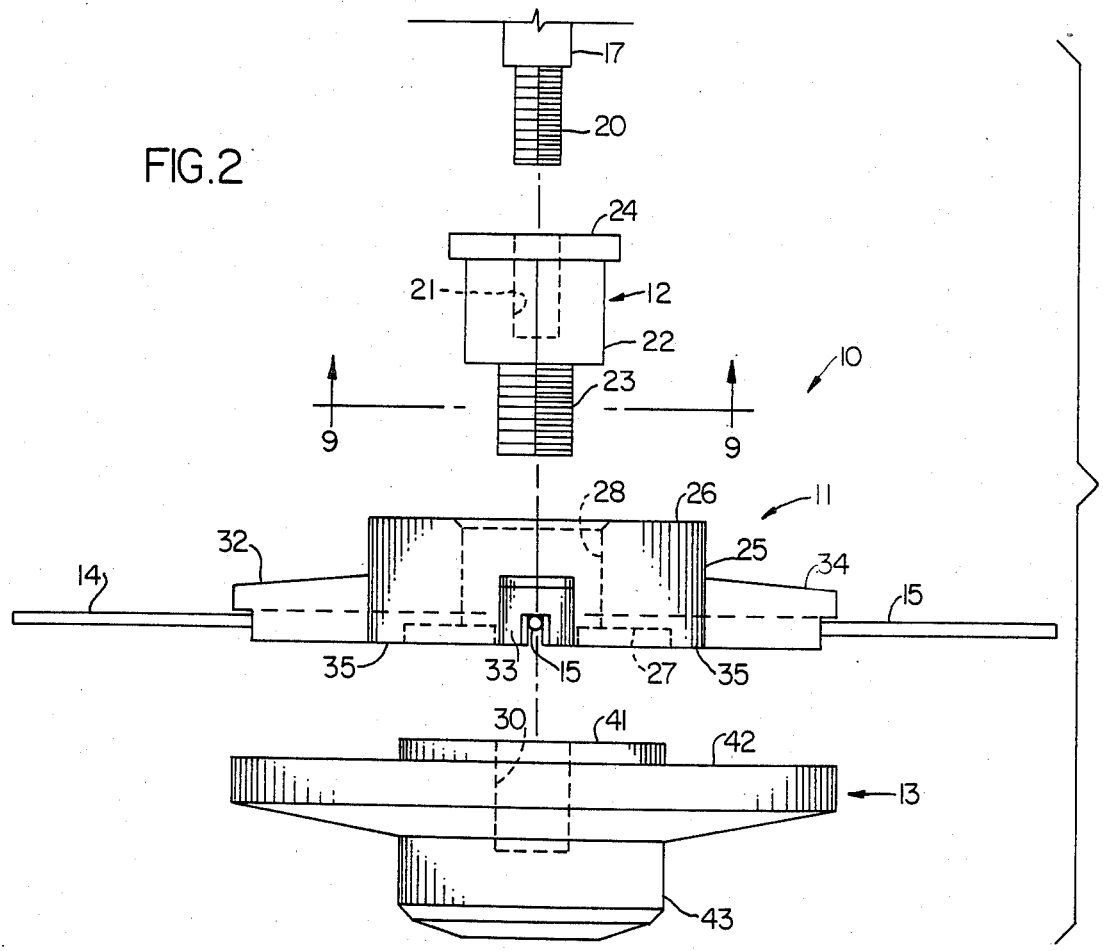
FIG. 2 is an exploded elevational view of the trimmer head illustrating its attachment to the drive shaft of a power tool.
Figure 4:
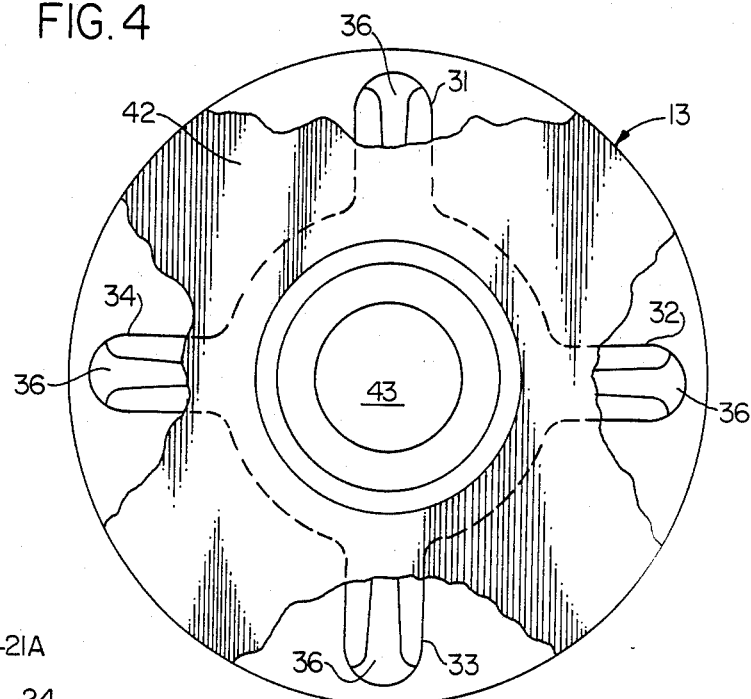
FIG. 4 is an inverted plan view looking at the circular shield with parts broken away to show the grooves in the fingers on the hub.

Referring more specifically to the drawings, the trimmer head, broadly indicated at 10 in FIGS. 1 and 2, comprises a head 11, an arbor 12, circular shield 13 and a pair of monofilament cutting elements 14 and 15. The cutting elements 14 and 15 are formed from a special formulation of polyurethane specifically developed to provide long service. Each of the illustrated cutting lines 14 and 15 is preferably 3½ inches long and 0.130 inches in diameter. The dimensions are not critical but have been found in actual practice to be satisfactory. Independent tests have established that operating a trimmer head with the lines 14 and 15 extending at a 30 degree to 45 degree angle will trim the vegetation next to walls and around trees for an average of 1½ to 2 hours without replacement. The line does not split and fray and wears away very slowly.

The trimmer head 10 is operably connected to a power tool, broadly indicated at 16 in FIG. 1, and including a rotatable drive element 17 extending from the lower end thereof in FIG. 1. The drive element 17 is shown in the exploded view of FIG. 2 for purposes of illustration, and it includes a threaded stud 20 for threadable engagement with the arbor 12 of the trimmer head. The arbor 12 has a threaded cavity 21 for reception of the threaded stud 20 on drive shaft 17 as most clearly appears in FIG. 2.

Power tools for operating lawn trimmers do not have a universal type of drive element. The drive elements may be shafts of varying diameter and some of the drive elements include a threaded bore instead of a stud such as shown at 20 on drive shaft 17. It is intended to market a trimmer head of this invention with a sufficient supply of arbors so that the trimmer head can be attached to any existing power tool. The supply of arbors to be packaged with each trimmer head will include arbors with different diameter threaded cavities 21 to accommodate the different diameters of studs on the drive shafts of existing power tools. The package of arbors offered with the trimmer head will also include at least one arbor with a threaded stud 21A (FIG. 8) for engagement with a threaded cavity in the drive element of a power tool.

Figure 8:
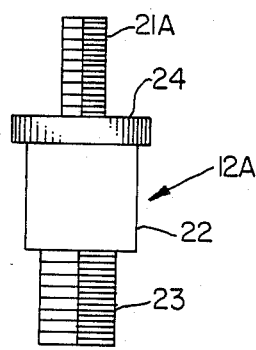
FIG. 8 is a side elevation of a modified form of arbor.
Figure 9:
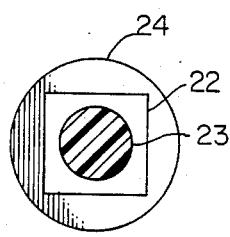
FIG. 9 is an inverted plan view of the arbors of FIGS. 2 and 8 looking in the direction of the arrows 9—9 in FIG. 2.
Figure 3:
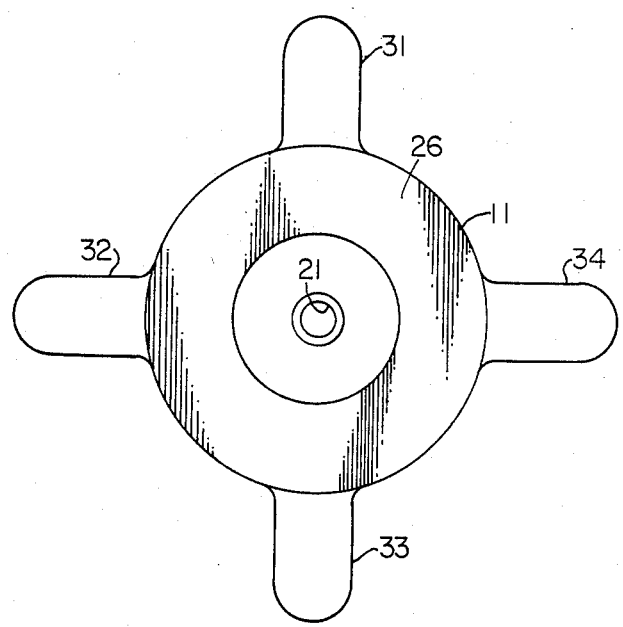
FIG. 3 is a plan view of the trimmer head and arbor.

Arbors 12 and 12A and all other arbors to be offered with the trimmer head include a square chuck 22 (FIG. 9) and a threaded stud 23 extending downwardly from the chuck 22 in FIGS. 2 and 8. A circular rim 24 extends about the other or upper end of the chuck 22 in FIGS. 2 and 8.

The head 11 comprises a circular hub 25 with a top surface 26 and a lower surface 27. The circular hub 25 has a square passageway 28 extending between and communicating with the top surface 26 and lower surface 27 to receive the correspondingly shaped and dimensioned chuck 22 of the arbor 12. The stud 23 projecting from the arbor 22 extends beyond the lower surface 27 of the hub 25 for engagement with a threaded cavity 30 in the circular shield.

An annular rim 35 surrounds the lower surface 27 of the hub 25 and extends downwardly beyond the lower surface 27 in FIG. 2 so that the lower surface 27 is recessed and is, in effect, a cavity. Fingers 31, 32, 33 and 34 project from the 12:00 o'clock, 3:00 o'clock, 6:00 o'clock, and 9:00 o'clock positions, respectively, of the hub 25 in FIG. 5. The lower surfaces of the fingers 31, 32, 33 and 34 lie in the same plane as the lower surface of the annular rim 35, as most clearly seen in the inverted plan view of the head 11 in FIG. 5. Each of the fingers has a groove collectively identified at 36. The grooves 36 extend between the free ends of their respective fingers and the cavity defined by the rim 35 and the lower surface 27 of the hub 25. The grooves 36 are in the same plane as the surface of cavity 27. The juncture of each groove 36 with cavity 27 is the same width as the diameter of the monofilament cutters 14 and 15. Each groove tapers outwardly from its juncture with the cavity and is wider at its free end than at the juncture with the cavity.

Figure 7:
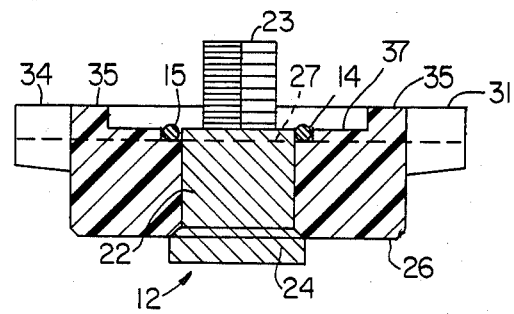
FIG. 7 is a sectional view taken substantially along the line 7—7 in FIG. 5.

The monofilament cutter element 14 is positioned for use in the fingers 31 and 32 and cutter element 15 is positioned for use in fingers 33, 34. A rounded abutment 37 rises from the surface of cavity 27 between the grooves 36 in fingers 31 and 32. The abutment 37 extends inwardly from the rim 35 toward the passageway 28 filled by the chuck 22 of the arbor 12. The abutment 37 is spaced from the passageway 28 and chuck 22 a distance no greater than the diameter of the monofilament cutter 14. The abutment 37 rises above the surface 27 a distance less than the diameter of the monofilament cutter 14 which, in the illustrated embodiment, measures 0.130 inches. By comparison, the height of the abutment 37 above the surface 27 is in the order of 0.075 inches. A corresponding abutment 40 extends between the fingers 33 and 34 to guide the monofilament cutter 15 between the grooves 36 in fingers 33, 34. The chuck 22 extends upwardly beyond the lower surface 27 a distance equal to about 178 the diameter of the flaccid monofilament polyurethane cutters 14 and 15 (FIG. 7). Consequently, the monofilament cutters 14 and 15 frictionally engage the respective abutments 37 and 40 and the proximal sides of the square chuck 22 in use. The cutters 14 and 15 are also frictionally engaged at the junctures of the grooves 46 with the cavity 27.

Figure 5:
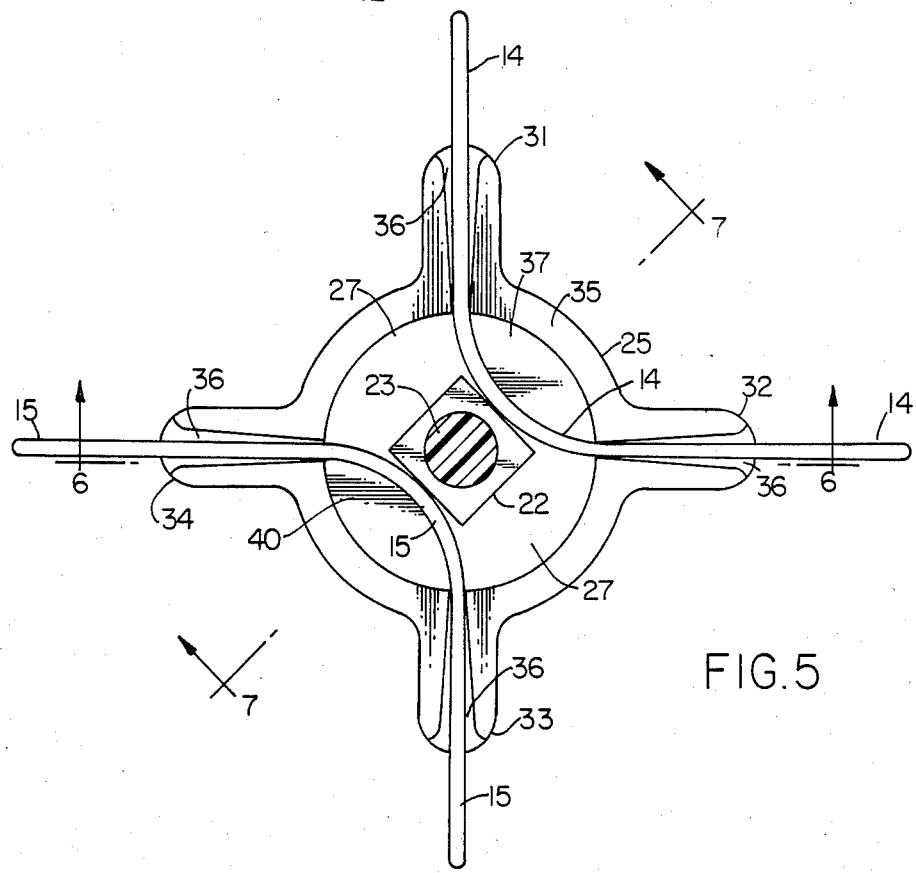
FIG. 5 is an inverted plan view of the head and arbor.
Figure 6:
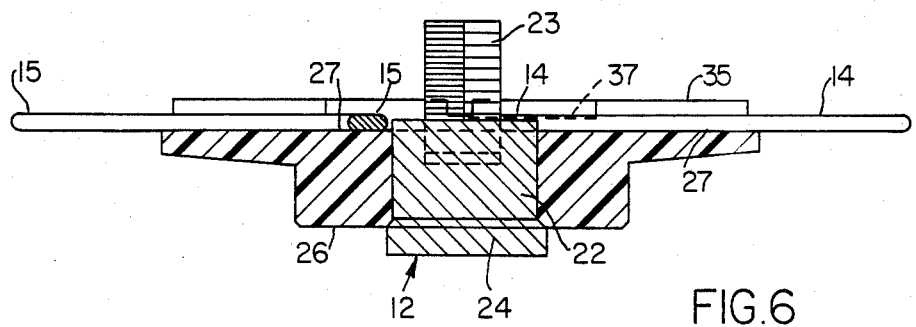
FIG. 6 is a sectional view taken substantially along the line 6—6 in FIG. 5.

It is apparent from FIG. 5 that the medial portions of both cutters 14 and 15 are radially stabilized by the chuck 22 and respective abutments 37 and 40. The stabilization thus provided is helpful in loading the flaccid cutters on the head. Loading is accomplished by positioning the cutters in the grooves 36 of their respective fingers with the medial portions of the cutters extending across that portion of the cavity 27 between the chuck 22 and respective abutments 37 and 40. Loading is completed by pressing the cutters into the space between the chuck and abutments which frictionally engage and retain the cutters.

Assembly of the trimmer head is completed by threading the circular shield 13 onto the stud 23 extending beyond the cavity 27 from the arbor 12. The circular shield 13 includes a clamping plate 41 extending about the bore 30 and having an outer diameter corresponding to the inner diameter of the cavity 27. The clamping plate 41 extends from the circular shield 13 a distance at least equal to the depth of the cavity 27 and the clamping plate 41 is receivable within the cavity 27 as the circular shield 13 is threaded on the arbor.

The circular shield 13 includes a circular guard 42 having a diameter slightly greater than the overall diameter of the head and its fingers. The guard protects the fingers from contacting immovable objects such as trees and walls which would break the rapidly rotating fingers on impact. The circular shield 13 also includes a hand grip 43 extending from the side of the guard 42 opposite the clamping plate 41. The hand grip 43 is intended to be grasped to rotate the circular shield for threadable engagement with the arbor after the cutters 14 and 15 have been positioned for use and are frictionally retained between the abutments and the chuck. The clamping plate 41 moves into the cavity 27 as the circular shield is threaded on the arbor, and the clamping plate 41 first engages the cutters 14 and 15 as the circular shield is tightened against the head 11. In use, the cutters 14 and 15 are tightly clamped between the surface of the cavity 27 and the clamping plate 41, and frictionally engaged by the chuck and respective abutments.

When it is desired to replace a cutter, the circular shield is removed from the head by grasping the hand grip 43 and rotating the shield 13 until it is disengaged from the stud 23. The old cutters are quickly removed and the new cutters are quickly installed in the manner described and the apparatus is ready for use with a minimum of delay.

Although it is preferred that the trimmer head be used with the special formulation of polyurethane which does not fray or split and which wears very slow and provides a longer life than other known monofilament cutter elements, it is to be understood that the trimmer head can be used with nylon or any other type of flexible cutter. The width of the grooves at the juncture with the cavity and the width of the cavity between the chuck and the abutments should be the same as the diameter of the flexible cutting element for operational stability and to facilitate the loading of the cutters.

Although specific terms have been used in describing the invention, they are used in a generic and descriptive sense only and not for purposes of limitation.

I claim:

1. A weed trimmer having an arbor for attachment to an existing power tool, a head for supporting at least one flexible cutter, a circular shield engageable with said arbor through the head for connecting the head to the power tool and at least one flexible cutter mounted on the head and extending in a U-shaped configuration with the ends extending outwardly from the head and the central portion of the cutter spaced from the ends positioned to be clamped, means for physically clamping the said central portion of the cutter between the head and the shield to hold it in operative position during use, and said means including first means on the head for supporting the said central portion in position to be clamped and second means on the shield increasingly frictionally engageable with the said central portion of the cutter to clamp it between the head and the shield as the shield engages the arbor to connect the head to the power tool.

2. Apparatus according to claim 1 wherein said means on said circular shield comprises a clamping plate extending inwardly from the circular shield for engagement with the medial portions of the flexible cutter.

3. Apparatus according to claim 1 wherein the head has a groove communicating with the lower surface of the head and wherein said means clamps the medial portions of the flexible cutter in the groove.

4. Apparatus according to claim 3 wherein removal of the circular shield from the head exposed the flexible cutter for removal and replacement.

5. Apparatus according to claim 3 wherein at least a portion of each groove is undercut and of a dimension that the walls of the groove frictionally engage the flexible cutter when positioned in the groove for use.

6. Apparatus according to claim 1 wherein the cutter is constructed of flaccid material.

7. A kit for use on existing power tools for cutting vegetation such as grass and weeds, said kit comprising a trimmer head including a hub and an even number of fingers projecting radially from the hub, each of said fingers having a radially extending groove communicating with the undersurface of the finger, a flexible cutter positioned in the grooves in adjoining fingers with the medial portion of the flexible cutter adjacent the hub and the free ends of the flexible cutter extending outwardly beyond the fingers, a circular shield of greater diameter than the head, a clamping plate extending inwardly from the circular shield, a plurality of arbors, each of said arbors including a chuck and a threaded stud extending from one end of the chuck to pass through the head and engage the circular shield to clamp medial portions of the flexible cutters between the head and the clamping plate in use, and means at the other end of the chuck on each arbor in the kit for operative connection to an existing power tool.

8. A kit according to claim 7 wherein the means for operative connection to an existing power tool comprises a threaded stud on at least some of the arbors in the kit.

9. A kit according to claim 7 wherein the means for operative connection to an existing power tool comprises a threaded bore in at least some of the arbors in the kit.

10. Apparatus according to claim 7 wherein the hub has a cavity and the clamping plate seats in the cavity and against the flexible cutters to clamp them in operative position during use.

11. Apparatus according to claim 10 wherein an abutment is positioned in the cavity between two adjoining fingers, and wherein the medial portion of the flexible cutter positioned in said adjoining fingers is located on the said abutment for engagement by the clamping plate when the trimming head is assembled for use.

12. A trimmer head for use with existing power tools and comprising an arbor for attachment to a power tool, a head for supporting at least one flexible cutter in position for use, a circular shield engageable with said arbor through the head for connecting the head and its cutters to the power tool, means on said circular shield clamping the medial portions of the cutter against the head as the shield is firmly connected to the arbor, said arbor including a chuck extending through the head and fixed against relative rotation, said head comprising a hub having a rim extending beyond one surface and defining a cavity, a plurality of fingers extending radially from the hub, a radially extending groove in each finger communicating with the cavity and with the free end of the finger, an abutment extending between two adjacent fingers and spaced from the chuck, said flexible cutter being positioned in the grooves in said two adjacent fingers with its medial portion extending between the abutment and the chuck, the distance between the abutment and the chuck being no greater than the diameter of the flexible cutter, and diameter of the flexible cutter being greater than the height of the abutment.

* * * * *